(12) United States Patent
Kochman et al.

(10) Patent No.: US 9,526,225 B2
(45) Date of Patent: *Dec. 27, 2016

(54) DAIRY MILKING LINER

(71) Applicant: Lauren AgriSystems, Ltd., New Philadelphia, OH (US)

(72) Inventors: Aaron Kyle Kochman, Gnadenhutten, OH (US); Christopher B. Pfeiffer, Marietta, OH (US); Benjamin D. Nibali, Maryville, TN (US); Kristopher C. Hall, Maryville, TN (US); Gary L. Mitchell, II, Knoxville, TN (US)

(73) Assignee: Lauren AgriSystems, Ltd., New Philadelphia, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,102

(22) Filed: Dec. 4, 2015

(65) Prior Publication Data

US 2016/0081294 A1 Mar. 24, 2016

Related U.S. Application Data

(62) Division of application No. 14/101,303, filed on Dec. 9, 2013, now Pat. No. 9,247,708.

(60) Provisional application No. 61/734,940, filed on Dec. 7, 2012.

(51) Int. Cl.
| | |
|---|---|
| *A01J 5/04* | (2006.01) |
| *A01J 7/00* | (2006.01) |
| *A01J 5/16* | (2006.01) |
| *A01J 5/00* | (2006.01) |
| *A01J 5/08* | (2006.01) |
| *A01J 5/06* | (2006.01) |

(52) U.S. Cl.
CPC .. *A01J 7/00* (2013.01); *A01J 5/00* (2013.01); *A01J 5/041* (2013.01); *A01J 5/06* (2013.01); *A01J 5/08* (2013.01); *A01J 5/16* (2013.01)

(58) Field of Classification Search
CPC .................. A01J 7/00; A01J 5/06; A01J 5/08; A01J 5/16; A01J 5/04; A01J 5/044
See application file for complete search history.

(56) References Cited

U.S. PATENT DOCUMENTS

| | | | | | |
|---|---|---|---|---|---|
| 1,239,923 | A | * | 9/1917 | Leitch | A01J 5/08 119/14.49 |
| 1,249,134 | A | * | 12/1917 | Leitch | A01J 5/08 119/14.51 |
| 1,425,584 | A | * | 8/1922 | Gessler | A01J 5/08 119/14.49 |
| 1,690,327 | A | * | 11/1928 | Dinesen | A01J 5/06 119/14.52 |
| 1,822,680 | A | * | 9/1931 | Taylor | A01J 5/08 119/14.53 |

(Continued)

*Primary Examiner* — Monica Williams
(74) *Attorney, Agent, or Firm* — Zollinger & Burleson Ltd.

(57) ABSTRACT

A milking liner includes an integrated short air tube and short milk tube. In one configuration, the pulsation air is delivered through the bead of the milking liner directly inside the shell through a plurality of outlets. The disclosure also provides alignment features that assist the person assembling a milking liner and shell. The features limit rotation between the liner and the shell. The liner includes a short air tube that extends beyond a short milk tube with each having a sealing bead. The sealing beads are offset from each other.

14 Claims, 19 Drawing Sheets

(56) References Cited

U.S. PATENT DOCUMENTS

| | | | | |
|---|---|---|---|---|
| 1,896,321 | A | * | 2/1933 | Maes .................. A01J 5/08 119/14.49 |
| 2,136,956 | A | | 11/1938 | Schmitt |
| 2,334,481 | A | * | 11/1943 | Da Silveira .............. A01J 5/08 119/14.47 |
| 2,408,390 | A | * | 10/1946 | Gessler .................. A01J 5/08 119/14.49 |
| 2,425,873 | A | | 8/1947 | Gessler |
| 2,429,983 | A | | 11/1947 | Bender |
| 2,502,362 | A | * | 3/1950 | Babson .................. A01J 5/08 119/14.52 |
| 2,610,609 | A | | 9/1952 | Thomas |
| 2,777,420 | A | | 1/1957 | Schilling |
| 3,029,787 | A | | 4/1962 | Lamberson |
| 3,150,637 | A | | 9/1964 | Fosnes |
| 3,255,732 | A | * | 6/1966 | Raht .................. A01J 5/08 119/14.31 |
| 3,557,755 | A | * | 1/1971 | Close .................. A01J 5/08 119/14.47 |
| 5,590,622 | A | | 1/1997 | Wilson et al. |
| 6,006,695 | A | | 12/1999 | Gustafsson |
| 6,435,132 | B1 | * | 8/2002 | Milbrath .................. A01J 5/08 119/14.47 |
| 6,745,718 | B1 | * | 6/2004 | Chowdhury .............. A01J 5/08 119/14.47 |
| 7,021,239 | B2 | | 4/2006 | Steingraber et al. |
| 2002/0088402 | A1 | * | 7/2002 | Buecker .................. A01J 7/025 119/14.47 |
| 2008/0202433 | A1 | * | 8/2008 | Duke .................. A01J 5/08 119/14.49 |
| 2009/0151641 | A1 | * | 6/2009 | Wartenhorst .............. A01J 5/08 119/14.02 |
| 2014/0165918 | A1 | * | 6/2014 | Kochman .................. A01J 5/00 119/14.51 |
| 2015/0196003 | A1 | | 7/2015 | Brayer |

* cited by examiner

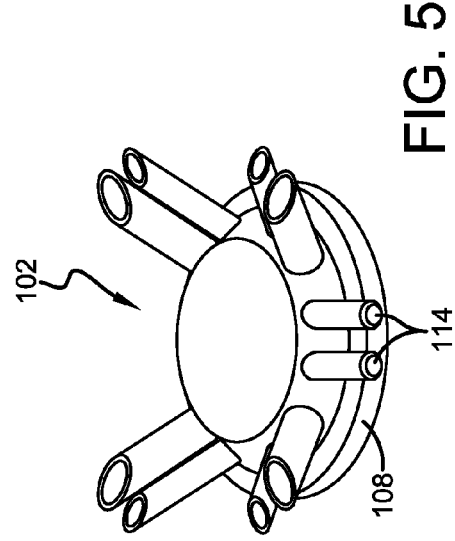
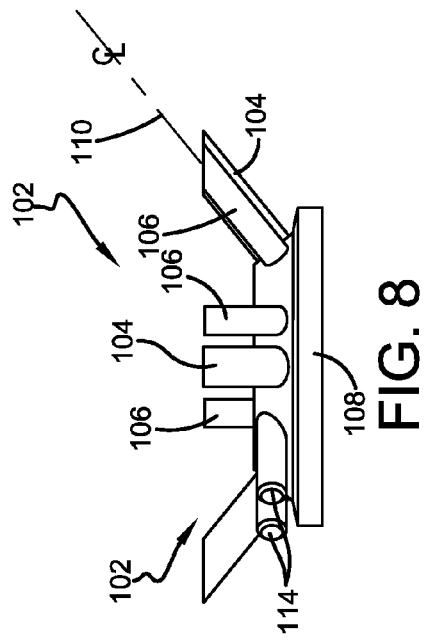
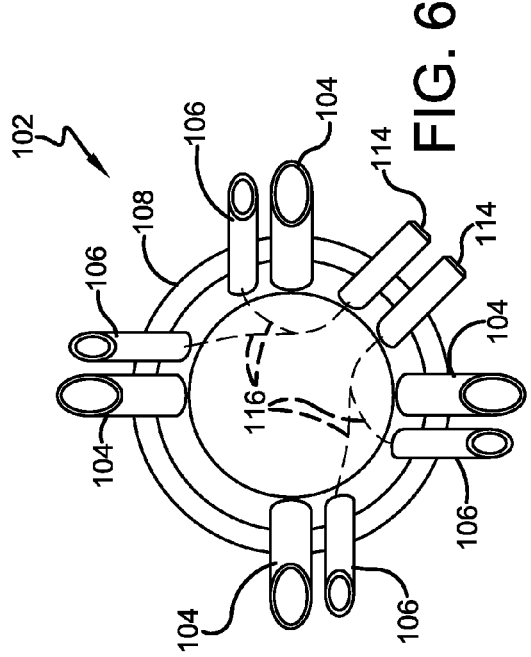
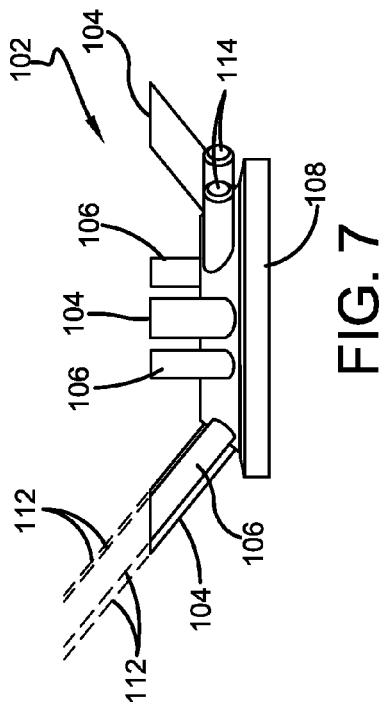

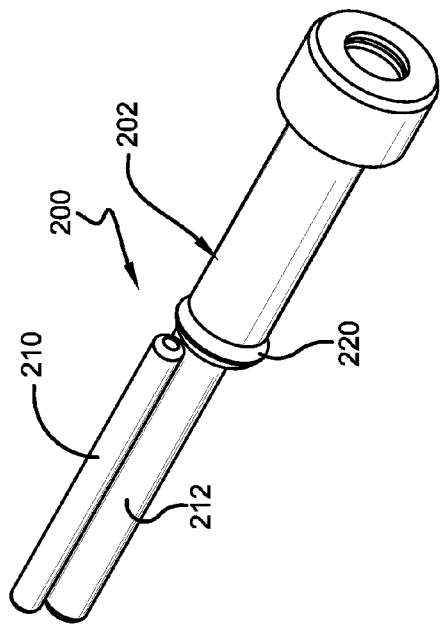
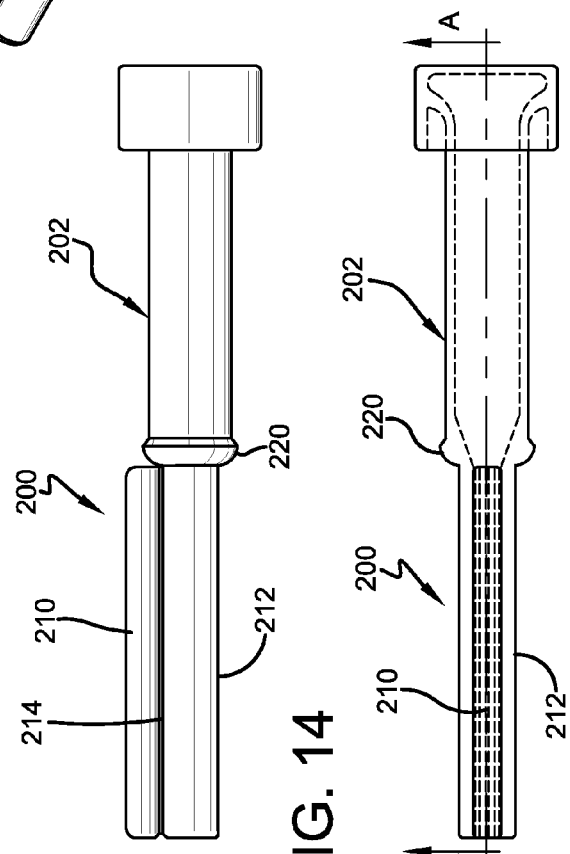
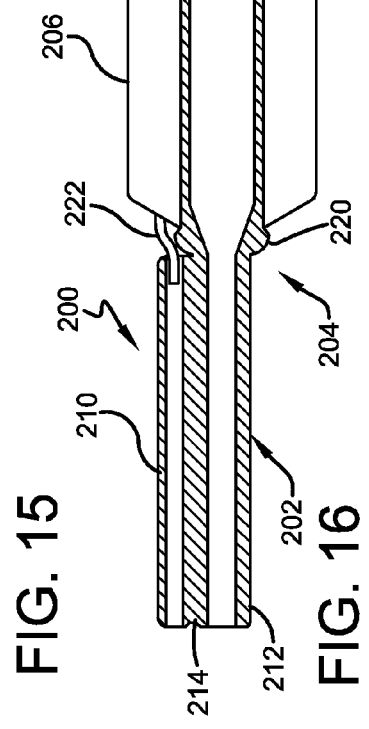
FIG. 13
FIG. 14
FIG. 15
FIG. 16

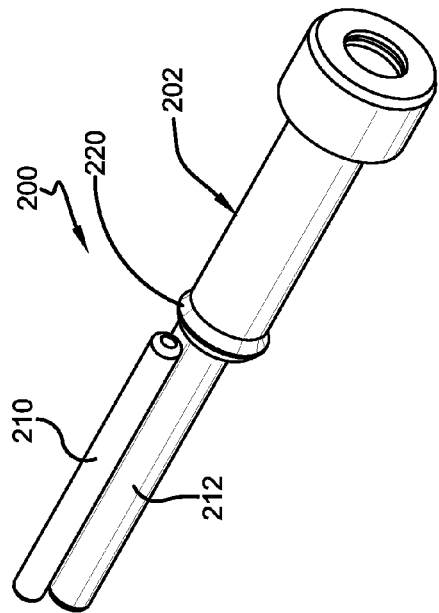
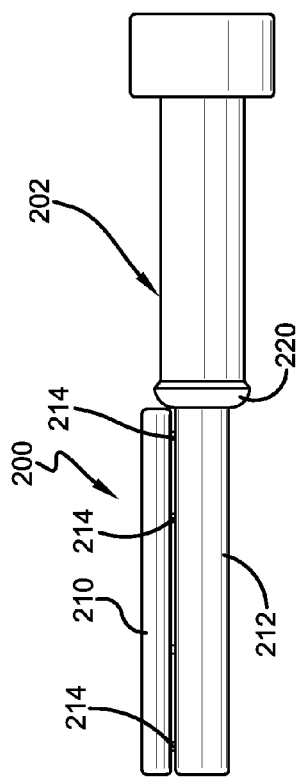
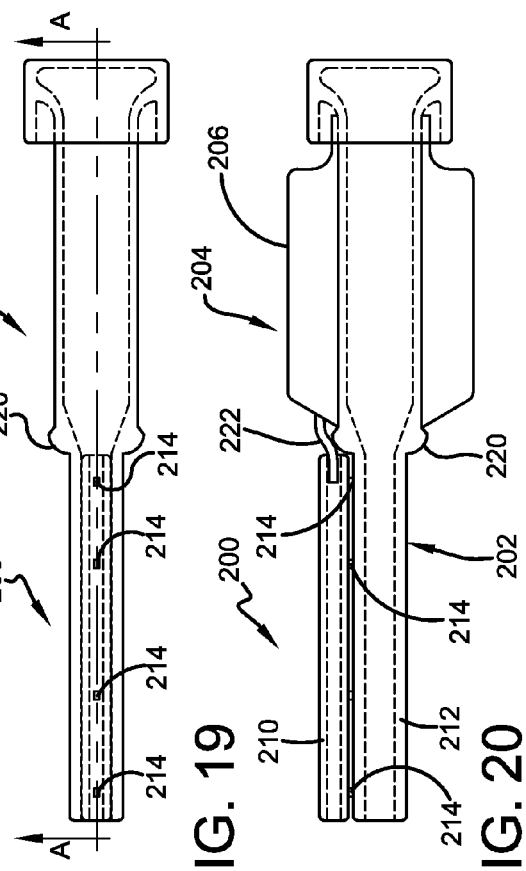
FIG. 17
FIG. 18
FIG. 19
FIG. 20

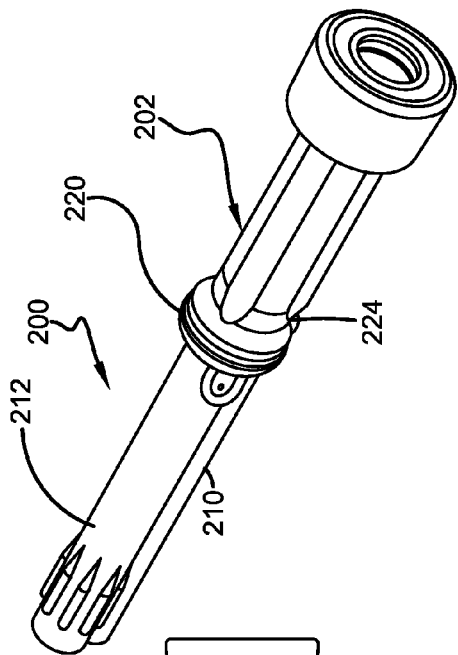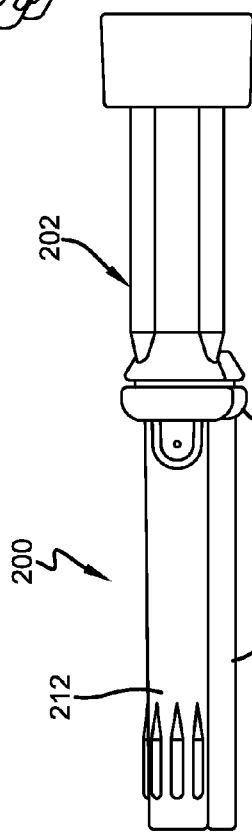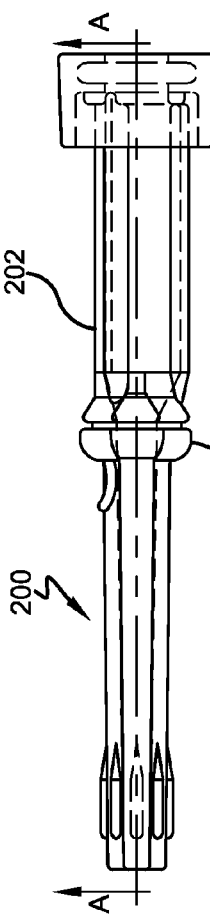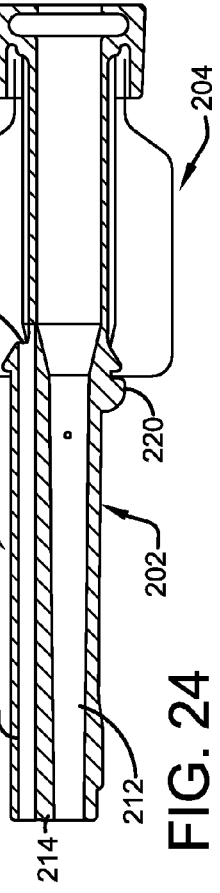

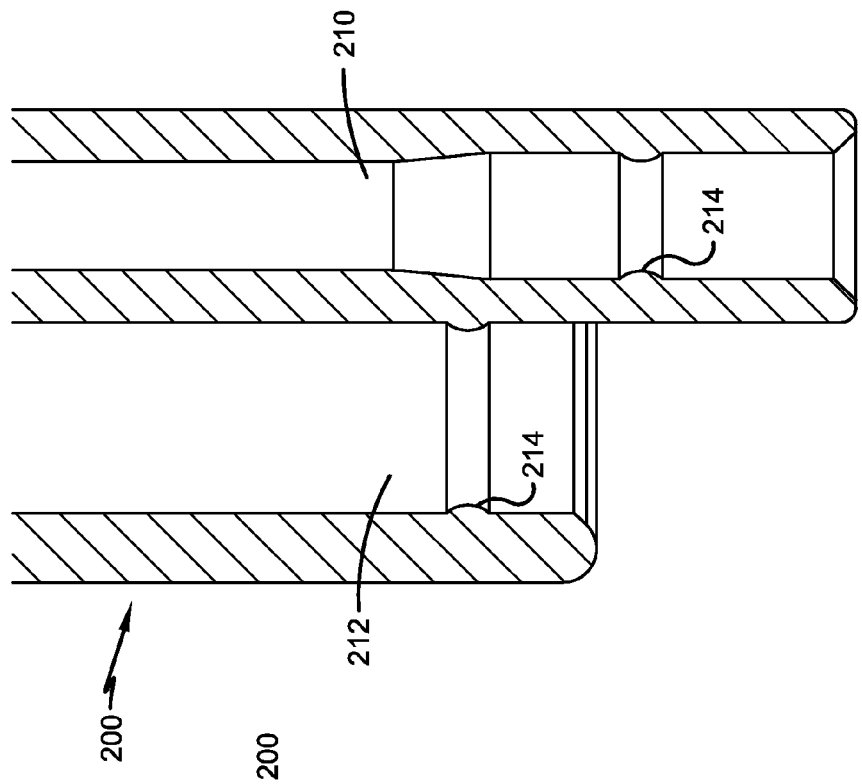
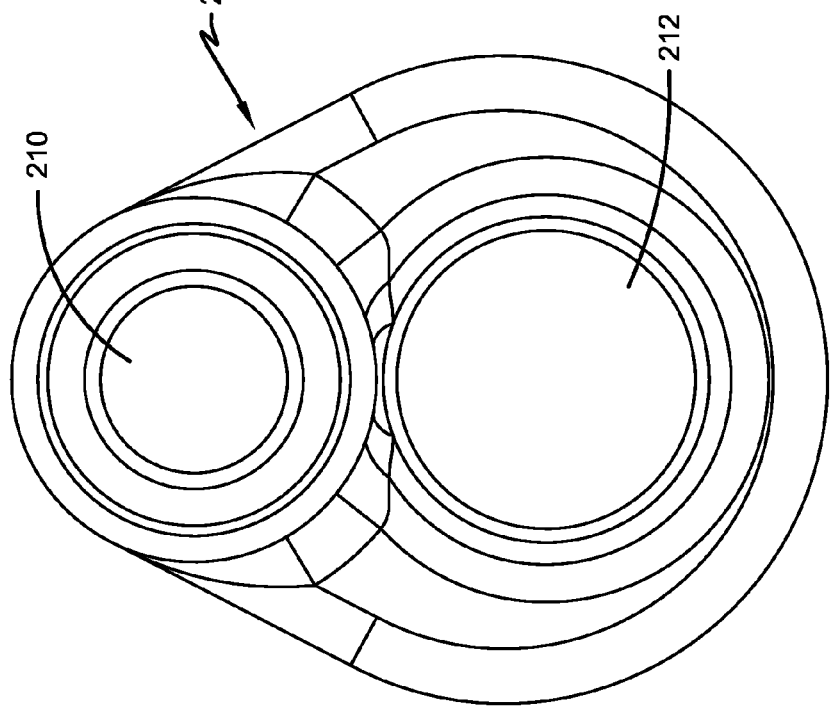

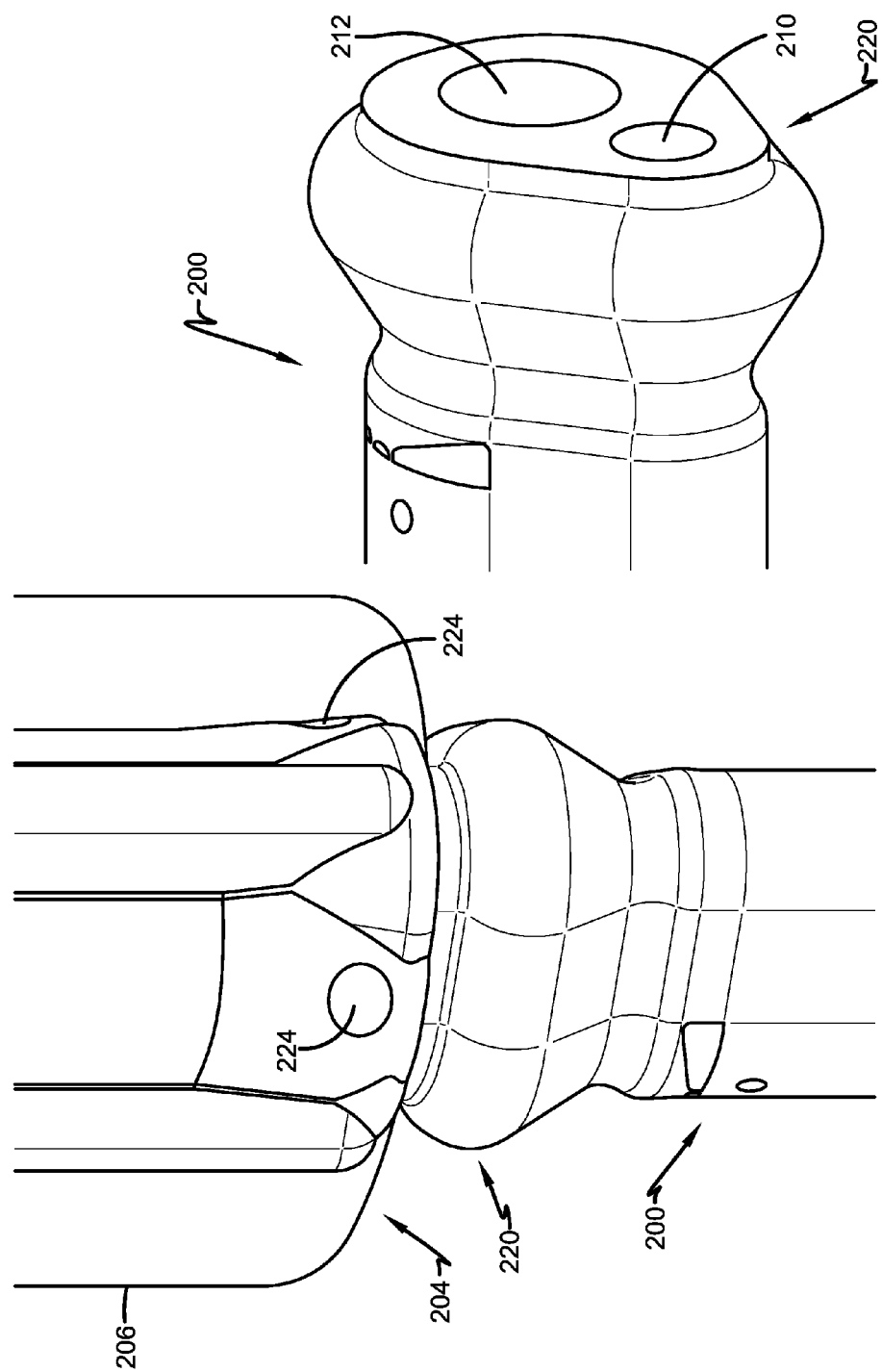

DAIRY MILKING LINER

CROSS REFERENCE TO RELATED APPLICATIONS

This application is a divisional application claiming priority to U.S. patent application Ser. No. 14/101,303 filed Dec. 9, 2013, which claims the benefit of U.S. Provisional Patent Application Ser. No. 61/734,940 filed Dec. 7, 2012; the disclosures of both are incorporated herein by reference.

BACKGROUND OF THE DISCLOSURE

1. Technical Field

The disclosure relates to one or more of the following items individually and in combination: vacuum dairy milking machinery, both manually-connected and robotically-connected; methods for extracting milk from dairy animals, milk claws, milk claw tops, pulsation caps (air dividers or air forks) used in conjunction with milk claws, the arrangement of pulsation nipples and liner nipples, milking liners, short milk tubes, short air tubes, milking liner and shell combinations, and method of delivering pulsation air to a milking liner and shell combination.

2. Background Information

Dairy milking machines are well known in the art. One common form of these machines includes a claw 2 (see FIG. 1) that typically has four liner nipples 4 that each receives an end of a short milk tube 6 which is, in turn, connected to (or integral with) a teat cup assembly 8 that is attached to a teat to extract milk. Each teat cup assembly includes a rigid (hard plastic or metal) shell with a resilient milking liner (also known as a milking inflation) disposed at least partially within the shell. The combination of claw 2 attached to four teat cup assemblies is known as a cluster. An alternating or pulsating vacuum is applied to each teat cup assembly 8 through a short air tube 10 to cause the liner inside the shell to collapse and expand and thereby massage and suck milk from the teats. The milk flows from the liners, into the short milk tube 6, to the liner nipples 4 of the claw 2, and from there through a milk hose 12 to a collection tank.

Claw 2 depicted in FIG. 1 has a typical arrangement wherein four liner nipples 4 project outwardly (away from the center of claw 2) and upwardly (toward the udder when claw 2 is in use) from four quadrants of claw 2 such that they are generally directed toward the location of the teats. These liner nipples 4 are spaced and angled to provide a predetermined alignment to the four teats on the cow's udder. The angle of alignment is commonly 20 to 50 degrees to the horizontal axis of claw 2. Another variation of the claw structure is a nippleless claw where the milking liner or short milk tube plugs directly into the claw top. The angle of the liner/short milk tube coming out of the top of the claw may be about 70 to 80 degrees to the horizontal axis of the claw.

A pulsation cap or air divider 20 (also known as an air fork 20) is commonly mounted, incorporated into, or placed on (or used in conjunction with) claw 2. Air forks 20 are where the pulsating vacuum flow delivered through pulsation tube 22 (commonly referred to as twin tube 22) is divided to individual flows for each teat cup assembly 8. The pulsation nipples 24 of air fork 20 are commonly disposed in a plane parallel to the horizontal axis of claw 2 as shown in FIGS. 1-3 or the pulsation nipples 24 of air fork 20 are tilted up to about twenty degrees from horizontal (as shown in FIG. 4).

FIG. 1 shows how short air tubes 10 bow outwardly and can interfere with the legs 26 of the cow while in the milking position. Some cows become annoyed with this contact and will try to "shake" the unit off or the cow will continually move to try to prevent short milk tubes 10 hose from touching her leg 26. Both of these scenarios are undesirable and can result in equipment falling off which requires a milker to reattach the unit or the unit may not get reattached resulting in the cow not being fully milked out. FIG. 1 also shows the potential for the cow to lift up the leg 26 on the left and push the cluster off. Notice the split in the hoof where a short air tube 10 or short milk tube 6 could become caught. There is also the potential of the leg 26 getting caught between the short air tube and short milk tube. Either of these scenarios would likely result in continued kicking. This could cause cuts in the tubes or hoses or breaking the cluster.

SUMMARY OF THE DISCLOSURE

The configurations of this disclosure are designed to improve the milking cluster in several different ways: improved alignment of the cluster during milking, making the cluster easier to handle (attaching to cow, placing in wash position, etc.), reducing the likelihood of the cluster interfering with the cow during milking, and reducing the likelihood of the cluster being stepped on or caught in the cows hoof or leg.

The disclosure provides configurations wherein the "bowing" outwardly of the short air tubes is eliminated when the cluster is in the milking position. In one configuration the bowing is reduced or eliminating by aligning the pulsation nipples with the liner nipples such that the centerlines of each are spaced apart but generally parallel. One exemplary configuration is provided wherein the pulsation nipples and air fork are integrated with the claw. Another configuration is provided wherein the air fork is separate from the claw but positions it pulsation nipples at the ends of arms such that the pulsation nipples are aligned with the liner nipples when the air fork is disposed on top of a claw. Eliminating the bowing of the short air tubes gives the cluster a more uniform alignment under the cow and decreases the likelihood of the short air tube interfering with the cow's legs while milking. It also provides for a sleeker easier to handle cluster assembly which is advantageous to milkers during attaching and handling. The design decreases the "footprint" of the cluster which helps with a number of other things, namely: getting caught in the cow's hoof/leg when detaching, less likely to bother the cow therefore less likely to get kicked off—both of these could lead to less cuts in the short air tube.

Proper cluster alignment is desirable. Clusters should hang as evenly under the udder as the shape of the udder allows. By eliminating the outwardly bowing short air tubes, the disclosed configurations provide a more compact design thus making it easier to hang the cluster properly and adjust it after it has been hung. The disclosed configurations reduce the likelihood that the short air tube will come into contact with the cow's leg is known to push the unit out of its natural hanging position.

The disclosure also provides an integrated short milk tube and short air tube. By eliminating the detached short air tube, the unit becomes easier to handle and prevents the gap from forming between the two tubes. The integrated configuration has uniform ends that engage the nipples of the air fork and claw side-by-side. This is an advantage as speed in the parlor desirable. On many dairy operations, the milkers grab the two liners on the left side with one hand and the two liners on the right side with the other hand. They simultaneously attach the front two teats with a liner from each hand and then the back teats the same way. The traditional short air tube makes it difficult to handle all four liners in this fashion as the air tubes pull the liners in a direction different from the short milk tube. When grabbing the traditional short air tube the liner and short air tube are bending on multiple axes at different planes to get to the milking position. The disclosed configurations provide tubes that direct force to the milking liner in a consistent manner which helps the milker attach pairs of liners at the same time.

The disclosure provides different configurations of the integrated short milk tube and short air tube wherein the shell of the teat cup assembly does not need to accommodate the short air tube because the pulsation air is delivered to the shell chamber through the bead of the milking liner.

The disclosure provides integrated short milk and short air tubes on a milking liner where the outlet of the short milk tube is offset axially from the inlet or outer end of the short air tube with the bead seals being offset as to not interfere with each other.

The disclosure provides a visual location feature that helps align the liner with the shell.

The disclosure provides features the limit rotation between the milking liner and the shell.

BRIEF DESCRIPTION OF THE DRAWINGS

FIG. 5 is a perspective view of the top of a claw with its pulsation nipples aligned with its liner nipples.

FIG. 6 is a top plan view of FIG. 5.

FIG. 7 is a front view of the claw of FIG. 5.

FIG. 8 is a right side view of the claw of FIG. 5.

FIG. 13 is a perspective view of one configuration of a milking liner with an integrated short milk tube and short air tube.

FIG. 14 is a side view of the milking liner of FIG. 13.

FIG. 15 is a top plan view of the milking liner of FIG. 13.

FIG. 16 is a section view taken along line A-A of FIG. 15 with a schematic shell added to show the relationship between the liner and the shell.

FIG. 17 is a perspective view of another configuration of a milking liner with an integrated short milk tube and short air tube.

FIG. 18 is a side view of the milking liner of FIG. 17.

FIG. 19 is a top plan view of the milking liner of FIG. 17.

FIG. 20 is a section view taken along line A-A of FIG. 19 with a schematic shell added to show the relationship between the liner and the shell.

FIG. 21 is a perspective view of another configuration of a milking liner with an integrated short milk tube and short air tube.

FIG. 22 is a side view of the milking liner of FIG. 21.

FIG. 23 is a top plan view of the milking liner of FIG. 21.

FIG. 24 is a section view taken along line A-A of FIG. 21 with a schematic shell added to show the relationship between the liner and the shell.

FIG. 25 is an end view of an alternative configuration of the integrated short milk and air tubes.

FIG. 26 is a section view taken through the tube ends of FIG. 25 showing the offset sealing beads.

FIG. 29 is a perspective view of the non-circular transition bead of the milking liner.

FIG. 30 is a section view through the neck of the transition bead that seats the shell showing the non-circular cross sectional shape of the transition bead.

Similar numbers refer to similar structures throughout the specification. Features of the different configurations described herein may be combined with features from other configurations to form configurations different than the examples shown in the drawings.

DETAILED DESCRIPTION OF THE DISCLOSURE

Figure 1:
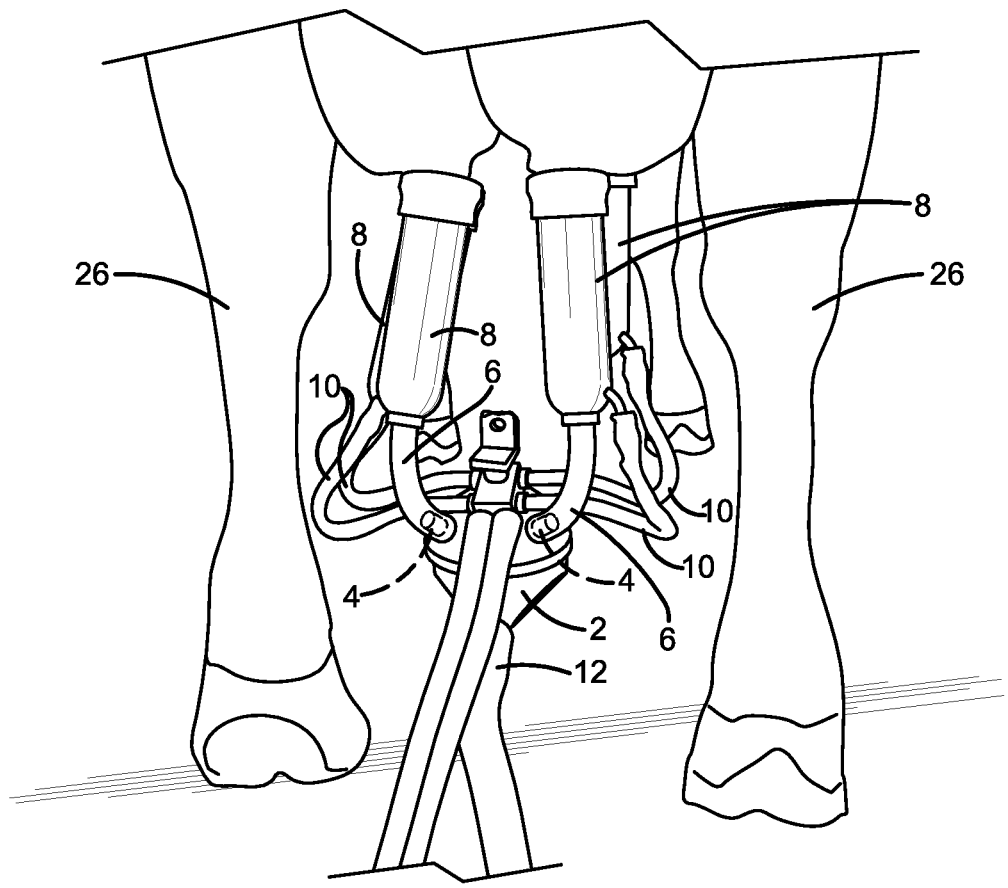
FIG. 1 is a view of a prior art milking cluster attached to the udder of a cow showing how the short air tubes bow away from the short milk tubes.
Figure 2:
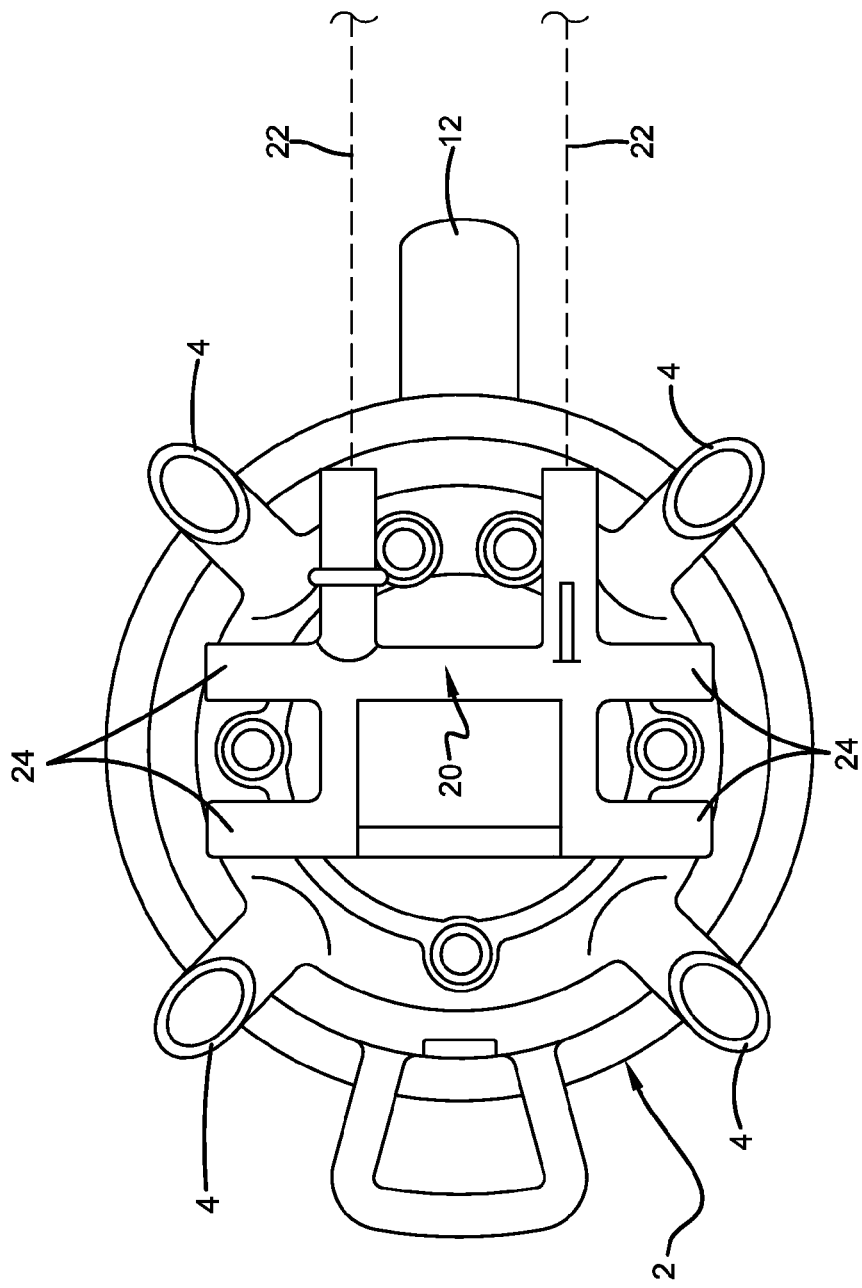
FIG. 2 is a top view of a prior art claw and air fork.
Figure 3:
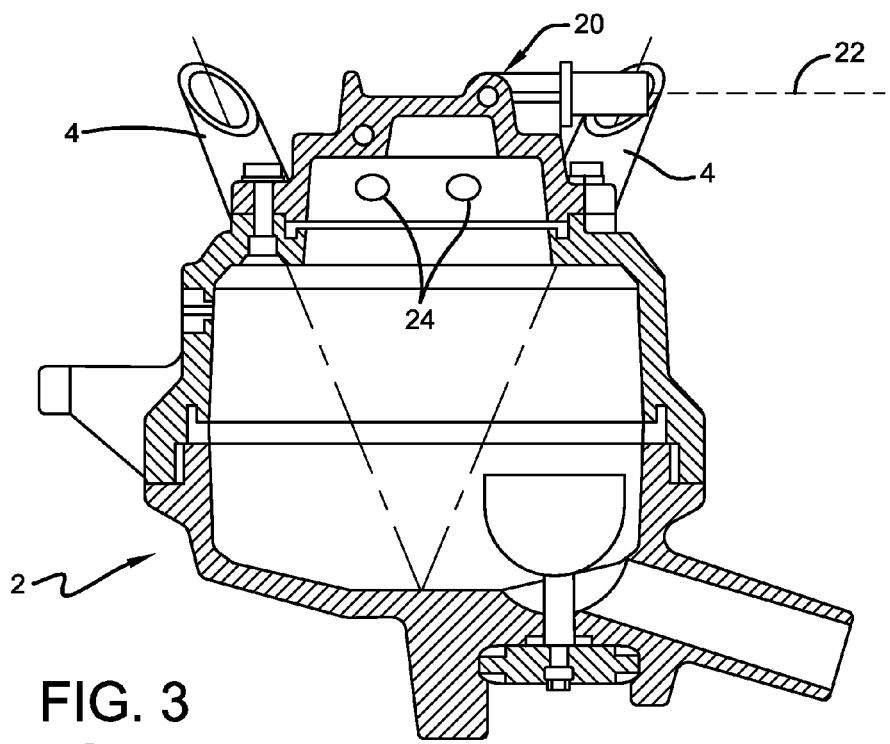
FIG. 3 is a side view of a prior art claw and air fork.
Figure 4:
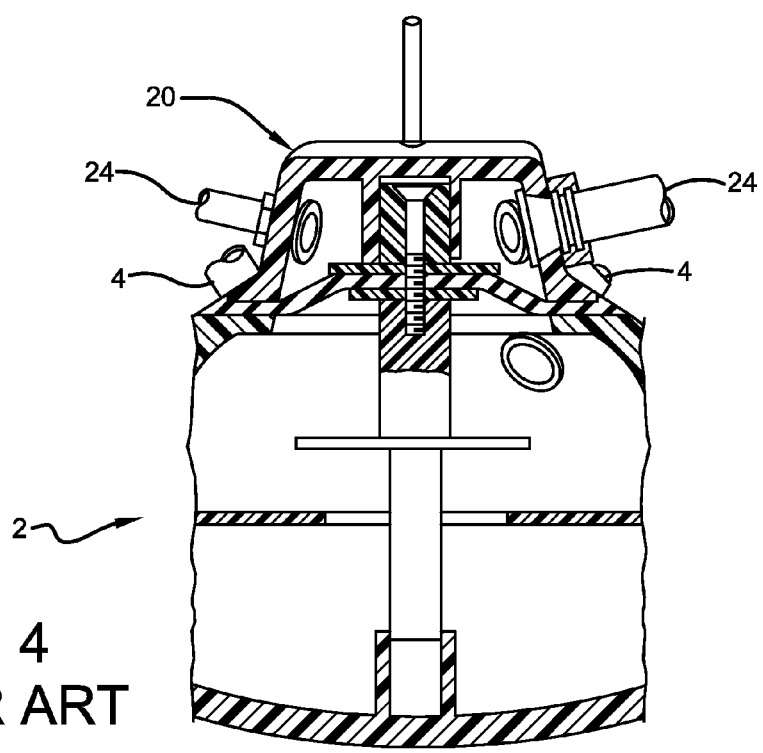
FIG. 4 is a side view of another prior art claw and air fork.
Figure 9:
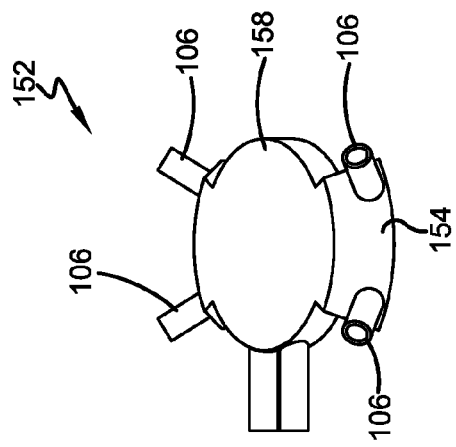
FIG. 9 is a perspective view of an air fork its pulsation nipples disposed on arms that align the pulsation nipples with liner nipples on a claw.
Figure 12:
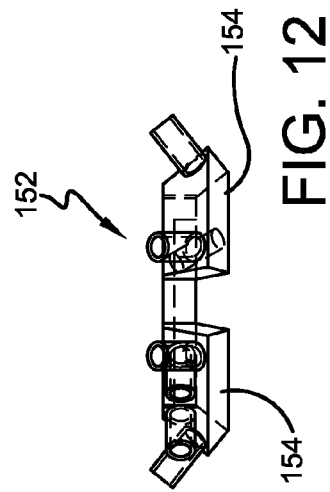
FIG. 12 is a right side view of the claw of FIG. 9.

An exemplary configuration of a claw top with an integrated air fork is indicated generally by the numeral 102 in FIGS. 5-8. Claw top 102 may be fabricated from a variety of materials such as metals and plastics. Claw top 102 may be removably connected to or integrally formed with any of a variety of claw bodies. Claw top 102 includes a plurality of liner nipples 104 and a corresponding number of pulsation nipples 106. Each pair of nipples 104 and 106 that are next to each other and configured to work with a single milking liner and shell combination is a nipple pair. Claw top 102 of FIG. 5 has four nipple pairs. Each liner nipple 104 is configured to be connected with the lower end of a short milk tube and each pulsation nipple 106 is configured to be connected with the lower end of a short air tube. Each nipple 104 and 106 extends away from the upper wall 108 of claw top 102 at an extension direction. The extension direction of each nipple of a nipple pair is substantially the same. In this context, both nipples 104 and 106 extend from wall 108 at similar (within 10 degrees of each other as measured to each standard XYZ axis) angles and they may be parallel in one particular configuration. The extension direction may be defined by the direction of the imaginary centerline 110 (FIG. 8) of each nipple or may be defined by the overall direction 112 of the outer sidewall (FIG. 7) of the nipple. The outer wall of each nipple may be smooth or ribbed to add gripping surfaces to the nipples. Arranging nipple 104 and 106 in the same extension direction minimizes bowing between the short air tube and the short milk tube.

In the exemplary configuration, nipples 104 and 106 are spaced apart so that the sidewalls of the tubes may be received between the nipples. In another configuration, nipples 104 and 106 touch each other for use with integrated tubes.

Claw top 102 also includes a pair of main pulsation delivery nipples 114 that receive the pulsation tube 22 that delivers the alternating vacuum. The body of claw top 102 defines passages 116 (shown schematically) that provide fluid communication between nipples 106 and 114. These passages 116 may be defined by the body of claw top 102 or provided by separate tubing.

Figure 10:
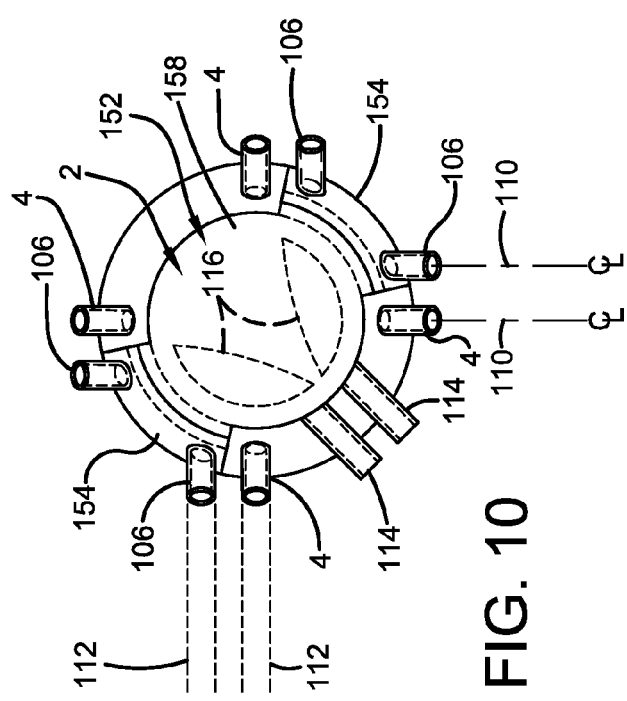
FIG. 10 is a top plan view of FIG. 9 showing the air fork used with a claw.
Figure 11:
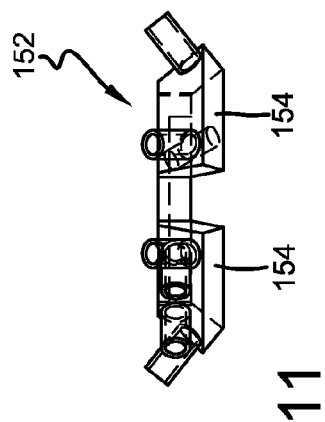
FIG. 11 is a front view of the claw of FIG. 9.

An exemplary configuration of an air fork for a claw 2 is indicated generally by the numeral 152 in FIGS. 9-12. Air fork 152 may be fabricated from a variety of materials such as metals and plastics. Air fork 152 is configured to be used in conjunction with a claw 2 and may be removably connected any of a variety of claws 2 for which air fork 152 is configured. Air fork 152 includes arms 154 that support pulsation nipples 106. The exemplary configuration uses a pair of spaced arms 154 that define gaps to receive liner nipples 4. In the exemplary configuration, arms 152 extend down from the main body 158 of air fork 152 and may extend outwardly and down so that they wrap around a portion of the top of claw 2 to position pulsation nipples 106 next to liner nipples 4 as shown in FIG. 10. Air fork 152 includes a pulsation nipple 106 for each liner nipple 4 of the claw 2 with which air fork 152 is to be used. When air fork 152 is properly positioned over claw 2, pulsation nipples 106 are disposed next to liner nipples 4 to define nipple pairs. Each liner nipple 4 is configured to be connected with the lower end of a short milk tube and each pulsation nipple 106 is configured to be connected with the lower end of a short air tube. Each nipple 106 extends away from arm 154 of air fork 152 at an extension direction. When air fork 152 is positioned on claw 2, the extension direction of each nipple pair is substantially the same. In this context, both nipples 4 and 106 extend at similar (within 10 degrees of each other as measured to each standard XYZ axis) angles and they may be parallel in one particular configuration. The extension direction may be defined by the direction of the imaginary centerline 110 (FIG. 10) of each nipple or may be defined by the overall direction 112 of the outer sidewall (FIG. 10) of the nipple. The outer wall of each nipple may be smooth or ribbed to add gripping surfaces to the nipples. Arranging nipple 104 and 106 in the same extension direction minimizes bowing between the short air tube and the short milk tube.

In the exemplary configuration, nipples 4 and 106 are spaced apart so that the sidewalls of the tubes may be received between the nipples. In another configuration, nipples 4 and 106 touch each other for use with integrated tubes.

Air fork 152 also includes a pair of main pulsation delivery nipples 114 that receive the pulsation tube 22 that delivers the alternating vacuum. The body 158 and arms 154 of air fork 152 defines passages 116 (shown schematically) that provide fluid communication between nipples 106 and 114. These passages 116 may be defined by the body 158 of air fork 152 or provided by separate tubing.

The disclosure also provides integrated dual short milk tube and short air tube configurations which are each generally indicated by the numeral 200 in FIGS. 13-29. The disclosure also provides a milking liner 202 that incorporates dual tube 200 as well as a liner and shell assembly 204 having dual tube 200. A variety of milking liner configurations may be used with these short air tube configurations. The configurations of FIGS. 13-29 are used in a method for delivering pulsation air to the shell 206 and a method for connecting a milking liner and claw.

In FIGS. 13-16, the short air tube 210 is connected along one side of the short milk tube 212 by a web 214 that extends substantially the entire length of short air tube 210. In other configurations, short air tube may be integrated into the body that defines short milk tube 212 in a manner similar to the configuration of FIGS. 21-24 or the passage of short air tube 210 may be formed in the sidewall of short milk tube 212. Multiple short air tubes 210 may be used. In the configuration of FIGS. 17-20, the connection between tubes 210 and 212 is with spaced webs 214 to provide more flexibility. In both configurations, milking liner 202 may be integrally molded.

Figure 39:
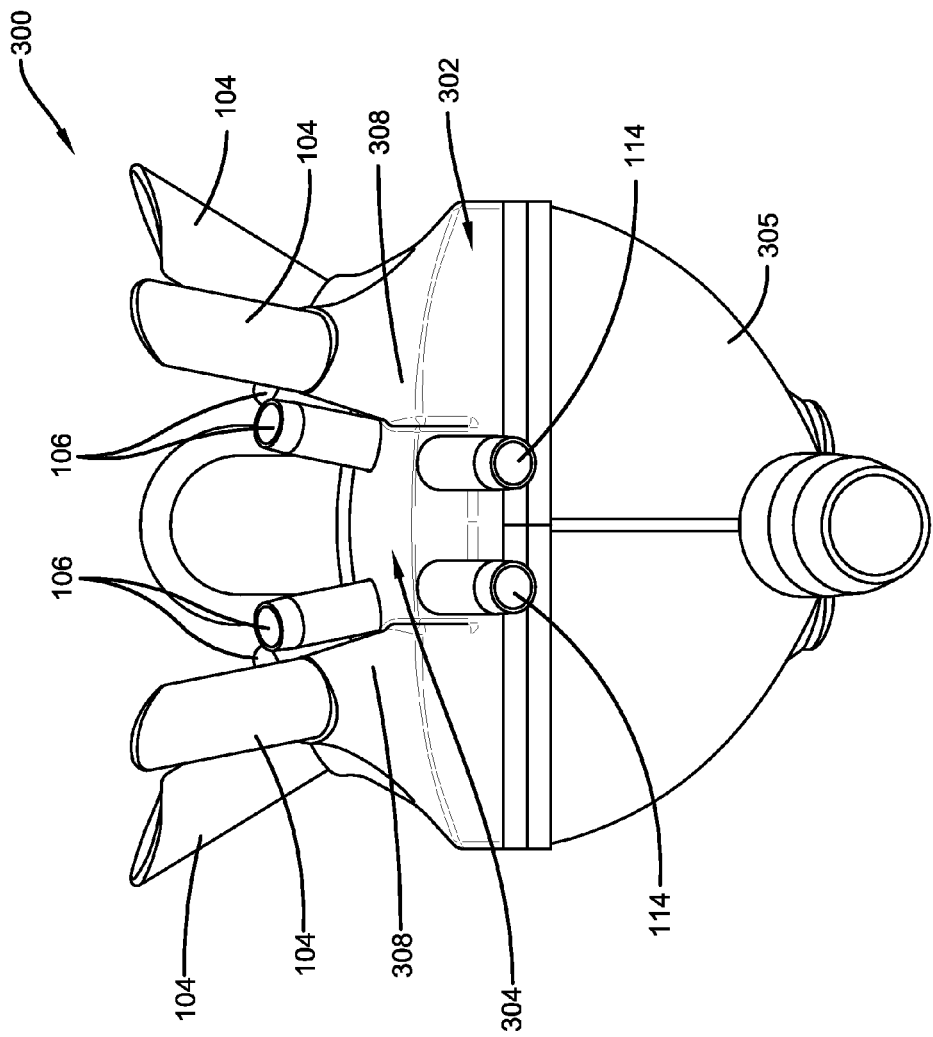
FIG. 39 is a front view of FIG. 36.
Figure 41:
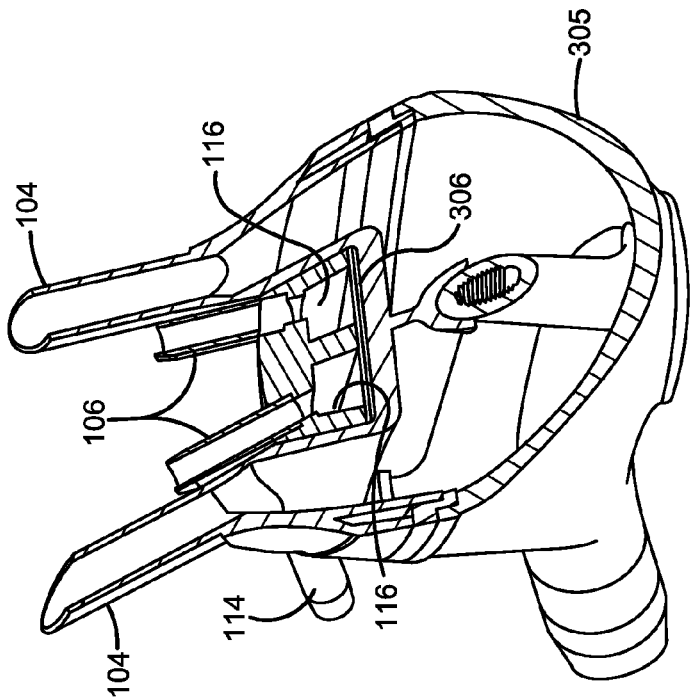
FIG. 41 is a section view of the claw top taken through two nipple pairs.
Figure 40:
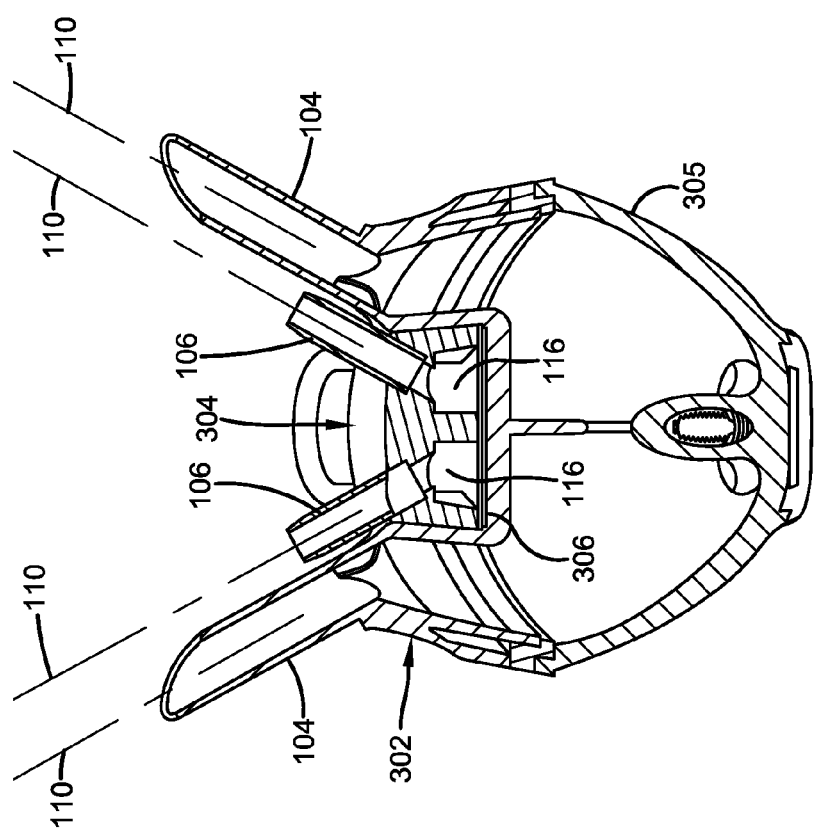
FIG. 40 is a section view of the claw top taken through two nipple pairs.
Figure 42:
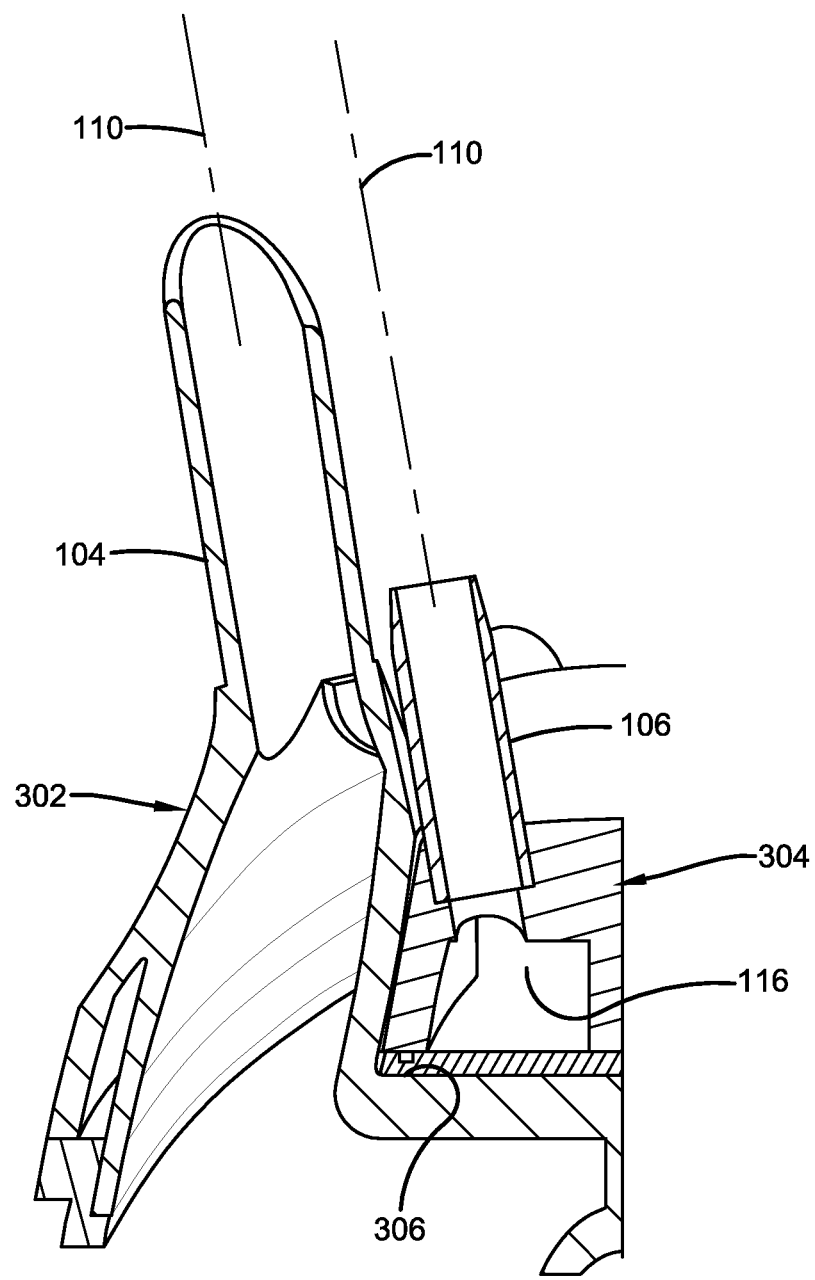
FIG. 42 is a section view of a single nipple pair of the claw top.

The lower ends of tubes 210 and 212 terminate at a common position in FIGS. 21-24 so they may be slipped onto nipples 204 and 206 at the same time. In FIGS. 25-29, short air tube 210 is longer than short milk tube 212 (to be used with nipples disposed at different heights as shown in FIG. 39). Offsetting the tube ends in the manner shown in FIG. 26 provides space to offset the sealing beads 214 the project inwardly from the inner surface of tubes 210 and 212 to engage the outer surfaces of nipples 104 and 106. In the configuration of FIG. 26, sealing bead 214 of short air tube 210 is disposed beyond the end of short milk tube 212 such that any compression of the material of short milk tube 212 will not interfere with sealing bead 214 on short air tube 210. An effective tube/nipple seal requires radial contact pressure in order to prohibit leakage between two bodies. This contact pressure must exist consistently in a "sealing plane" defined as a plane perpendicular to the tube axis. Non-uniform pressure distribution may create a path of lower resistance and therefore compromise a seal's overall effectiveness. In the configuration shown in FIG. 26, there are two tubes and two nipples disposed substantially parallel. If the radial contact pressure seal of each of the two lumens is created on or near the same perpendicular "sealing plane", there is a tendency for non-uniform contact pressure to be introduced to the system due to the seal forces opposing one another through their shared wall. The configuration of FIG. 26 avoids this sealing conflict by offsetting the "sealing planes" from one another along their shared axes. This allows the sealing contact pressure to be optimized individually at the two different perpendicular planes by avoiding opposing seal forces in a single plane. This offset seal arrangement also allows an offset parallel nipple arrangement. This nipple arrangement has advantages during attachment and removal of the dual-lumen tubes from the nipples. Because the high-pressure planes are offset from one another along the tube axis, the operator can accomplish some local rotation of each lumen individually relative to its nipple. This rotation relieves static friction between tube and nipple. This aids in axial movement of the tube since the operator must overcome only the dynamic sliding friction between the tube and nipple. Internal to each lumen, annular beads or bulges 214 are used to concentrate the available hoop tension force in order to increase contact pressure for improved sealing.

The offset ends combined with the offset height of nipples 104 and 106 allows combined tubes 210 and 212 to be slipped onto the nipples at the same time. The common extension direction of nipples 204 and 206 allow tubes 210 and 212 to be joined together close to the lower ends and minimizes bowing between tubes 210 and 212.

In the configurations of FIGS. 13-20, the upper end of short air tube 210 terminates below the transition bead 220 of liner 202 so that the air nipple 222 of shell 206 may be slipped into short air tube 210 when liner 202 is connected to shell. This is shown schematically in FIGS. 16 and 20.

Figure 28:
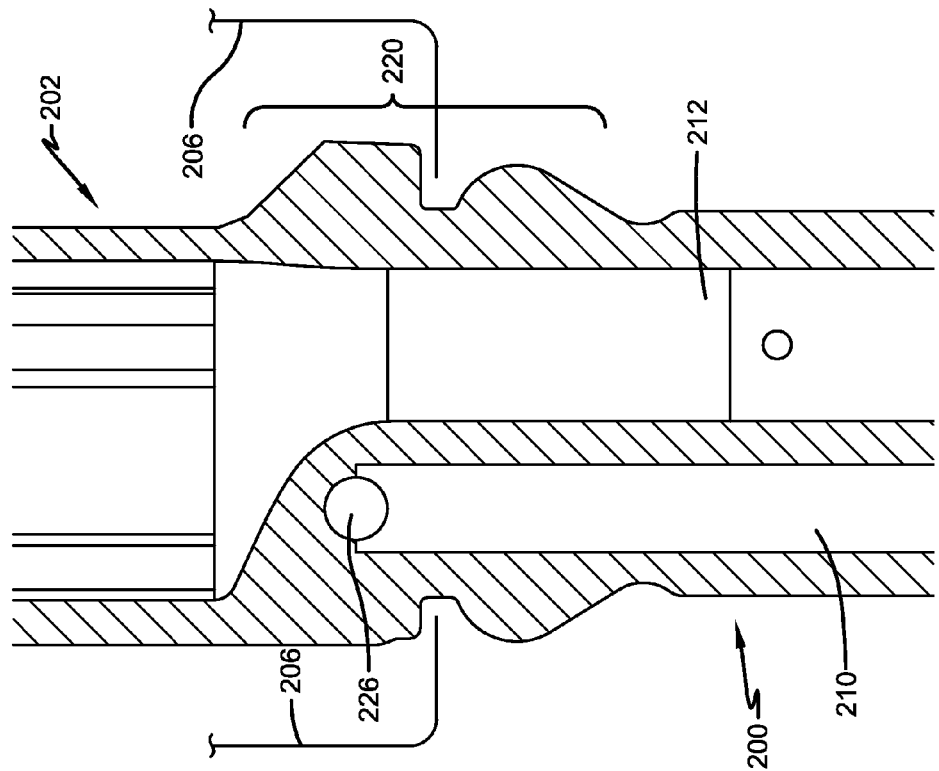
FIG. 28 is a section view taken through the short air tube of FIG. 27.
Figure 27:
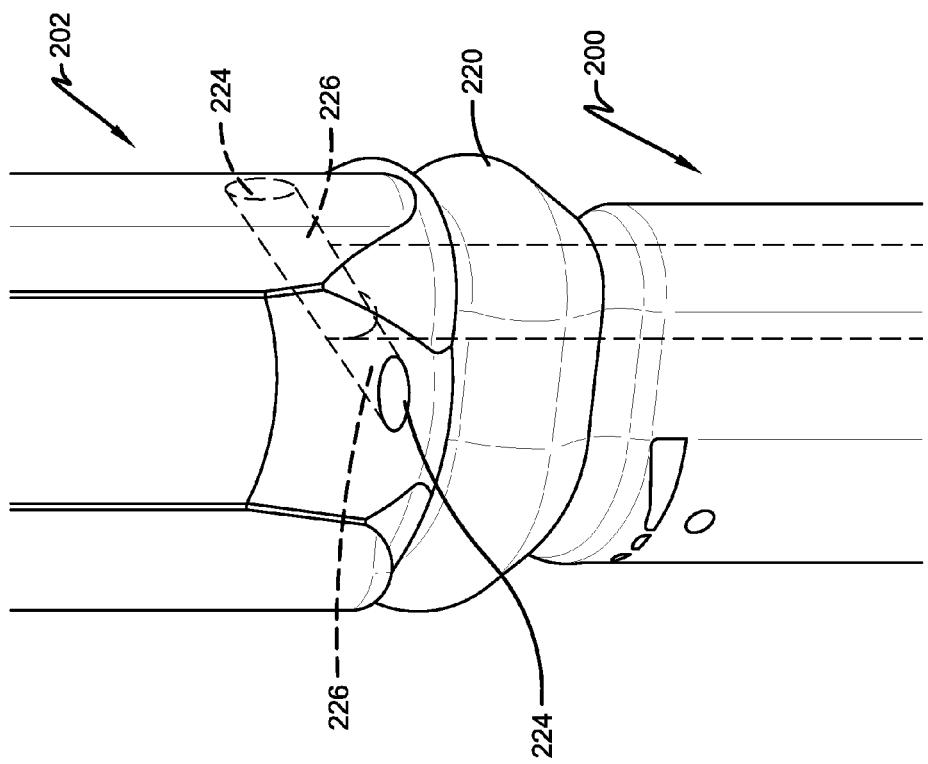
FIG. 27 is a perspective view of the milking liner showing an alternative configuration for creating multiple outlets for the short air tube above the liner bead within the shell.
Figure 32:
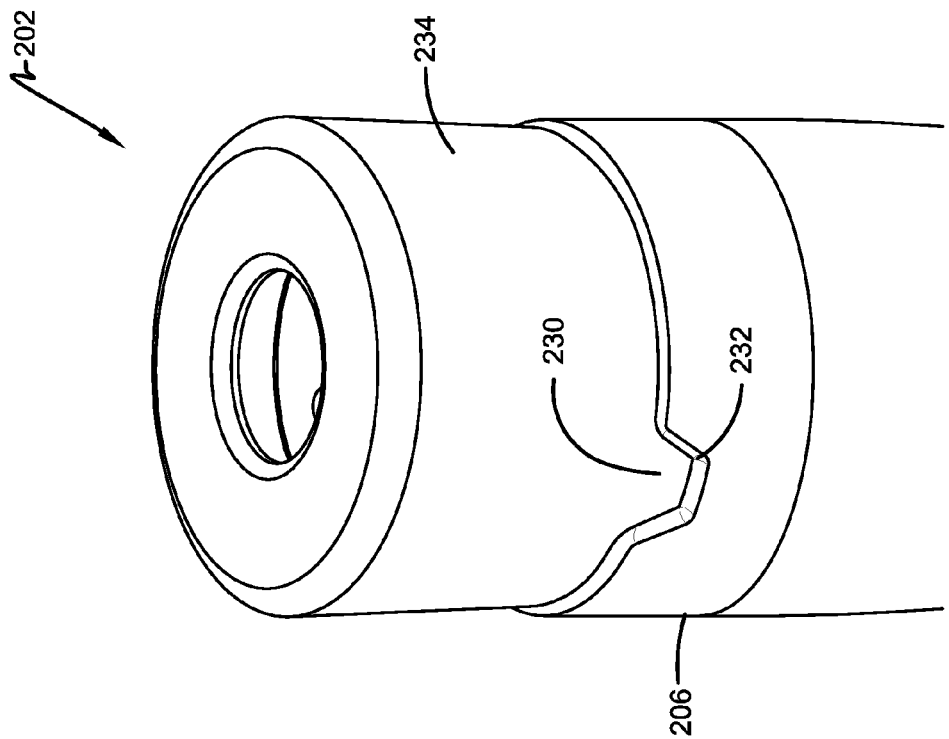
FIG. 32 is a perspective view of the mouthpiece of the milking liner configuration of FIG. 31 with its location tab received in a location notch of a shell.
Figure 31:
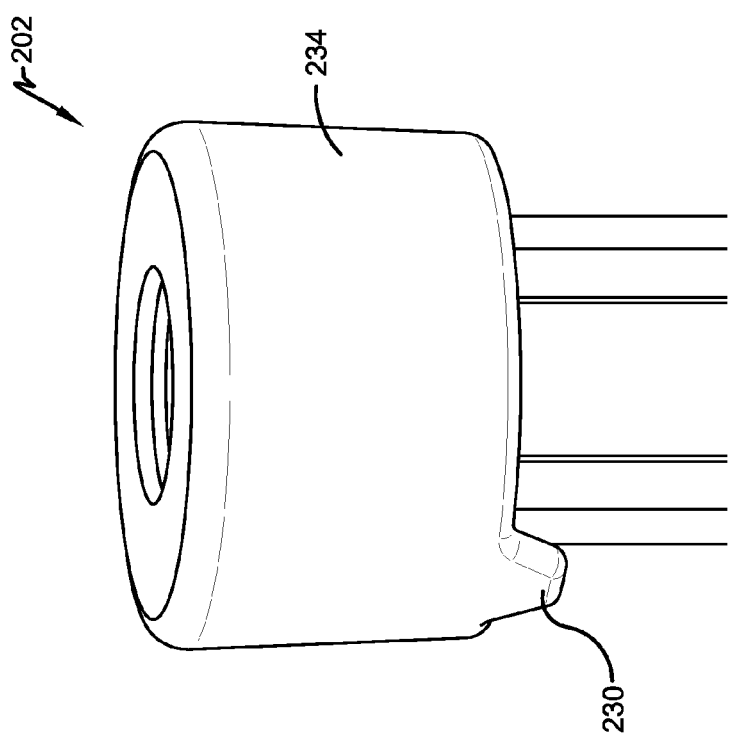
FIG. 31 is a perspective view of the mouthpiece of an exemplary milking liner configuration that uses a location tab.

In the configuration of FIGS. 21-29, short air tube 210 runs into or through transition bead 220 and bead 220 defines a continuation of the passage defined by short air tube 210 with one or more outlets 224 disposed at an exterior portion of liner 202 that is disposed within shell 206 on the barrel side of the transition bead 220. Multiple short air tubes 210 may be used with multiple passageways through bead 220. In the configuration of FIGS. 27 and 28, the pulsation channel branches into a plurality of outlet channels 226 disposed transverse to the main pulsation channel of short air tube 210. These outlet channels 226 extend to different sides of liner 202 so the pulsation vacuum is applied to different sections of the pulsation chamber (between the shell and the liner). This configuration allows the pulsation channel of short air tube 210 to be molded with a molding pin disposed along the longitudinal length of short air tube 210 to contact a transverse pin (or multiple pins) extending transverse to short air tube 210 to form outlet channels 226.

In the dual-lumen milking liner, the pulsation air path must reach the shell cavity. In the exemplary configurations of the liner 202, the pulsation air path exits directly into the shell cavity. The configuration of this exit path has implications for manufacturability of the liner. In the exemplary configuration, two co-axial pulsation air outlet channels 226 are perpendicular to the tube axis. During molding of the product, a common core pin can form both outlet channels 226. During the molding process, both pulsation exit and vent core pin side actions can occur from the same actuation in the molding tool. In one embodiment, the horizontal core pin axis substantially intersects the main pulsation path axis. This allows the short exit path core pin to support the long main pulsation path core pin. The end of the long core pin can have a "bird-mouth" shape (shown in FIG. 27) that saddles against the short core pin. This provides additional stability to the tooling, prolonging tool life.

The integrated tube configurations of FIGS. 13-29 allow the milker to quickly assemble the milking liner and shell combinations and connect the liners to the claw. The methods include the steps of connecting the short air tube and short milk tube to the claw nipples in one motion. The connection of the shell to the liner also forms the connection between the shell and the short air tube because the upper end of the short air tube is positioned in a fixed or predictable position with respect to the liner. The predictable position between shell 206 and liner 202 is achieved by providing bead 220 with a non-circular cross section as shown in FIGS. 29-30 wherein the seat that receives shell 206 is tear-drop or egg-shaped. The lower end of shell 206 matches the shape of this seat so that it can only be properly seated in a single orientation. The dual-lumen liner takes a natural "teardrop" or "egg" shape in cross section due to the diameter difference of the two lumens. In one embodiment, a consistent teardrop shape is shared by the bulb of the liner and throughout the tube of the liner, providing functional advantages during assembly and use. Throughout the tube, this shape allows for a uniform wall thickness and additional stiffness at the bulb. This shape also aids in anti-rotation of the liner relative to the shell during liner insertion and also in use.

Another feature to properly align the shell 206 with the liner 202 is the use of a location tab 230 and location notch 232. Tab 230 is a visual indicator that can be readily viewed by the user to properly align liner 202 and shell 206. In the configuration depicted in the drawings, tab 230 is disposed on the flange 234 of the mouthpiece 236 of liner 202 and notch 232 is defined by shell 206. In other configurations, notch 232 is defined by liner 202 and location tab is defined by shell 206. This indicator 230 serves as a visual and tactile tool to confirm proper assembly. In particular it demonstrates that no relative rotation has been introduced to the assembly of the shell and liner.

Figure 33:
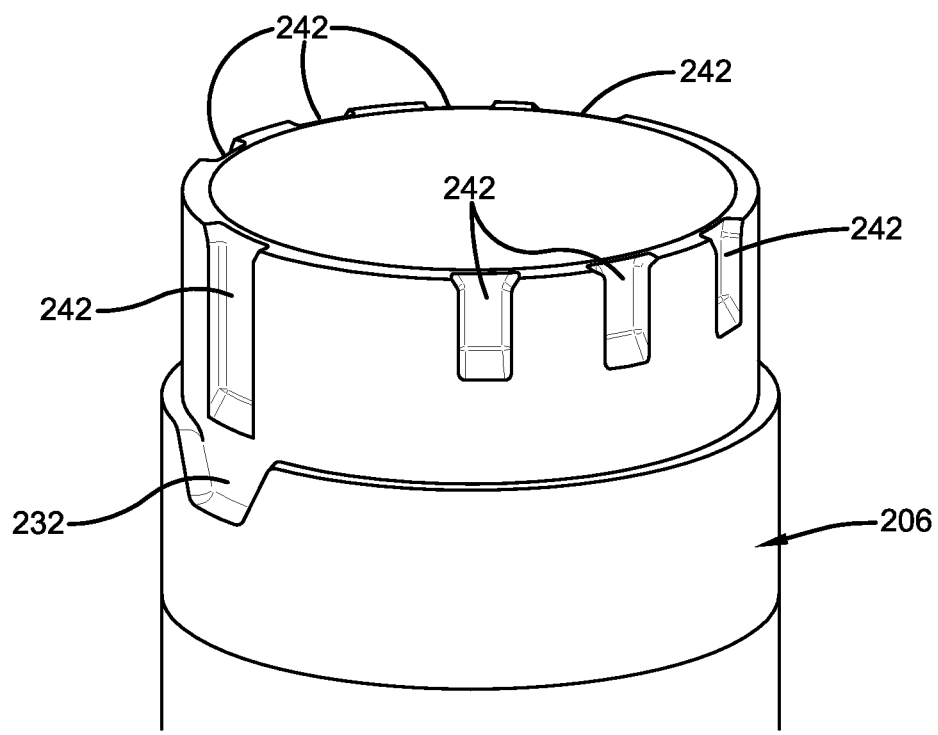
FIG. 33 is a perspective view of the top of the shell of FIG. 32 showing the location notch and some exemplary axial slots.
Figure 35:
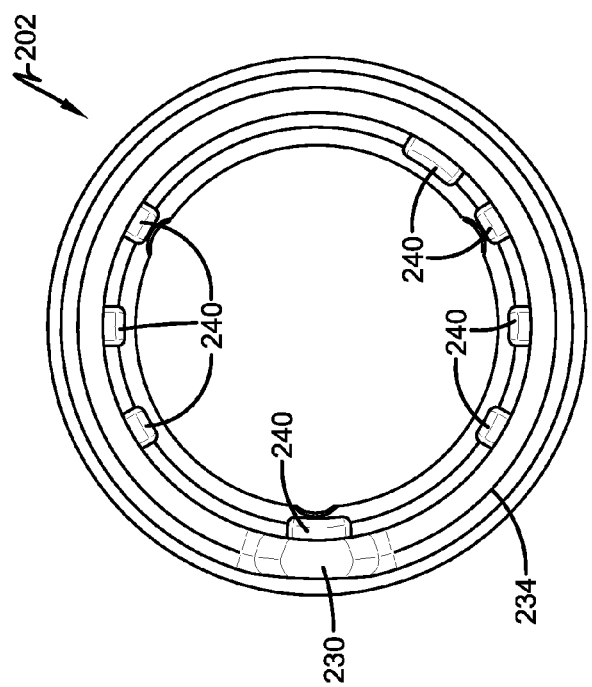
FIG. 35 is a view looking up at the mouthpiece flange showing the location tab and the alignment ribs that are received in the axial slots.
Figure 34:
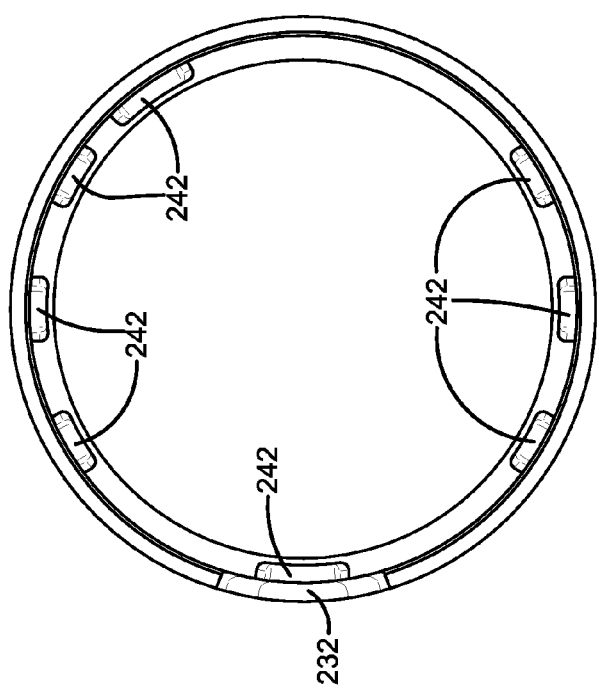
FIG. 34 is a top view of the shell of FIG. 33.
Figure 36:
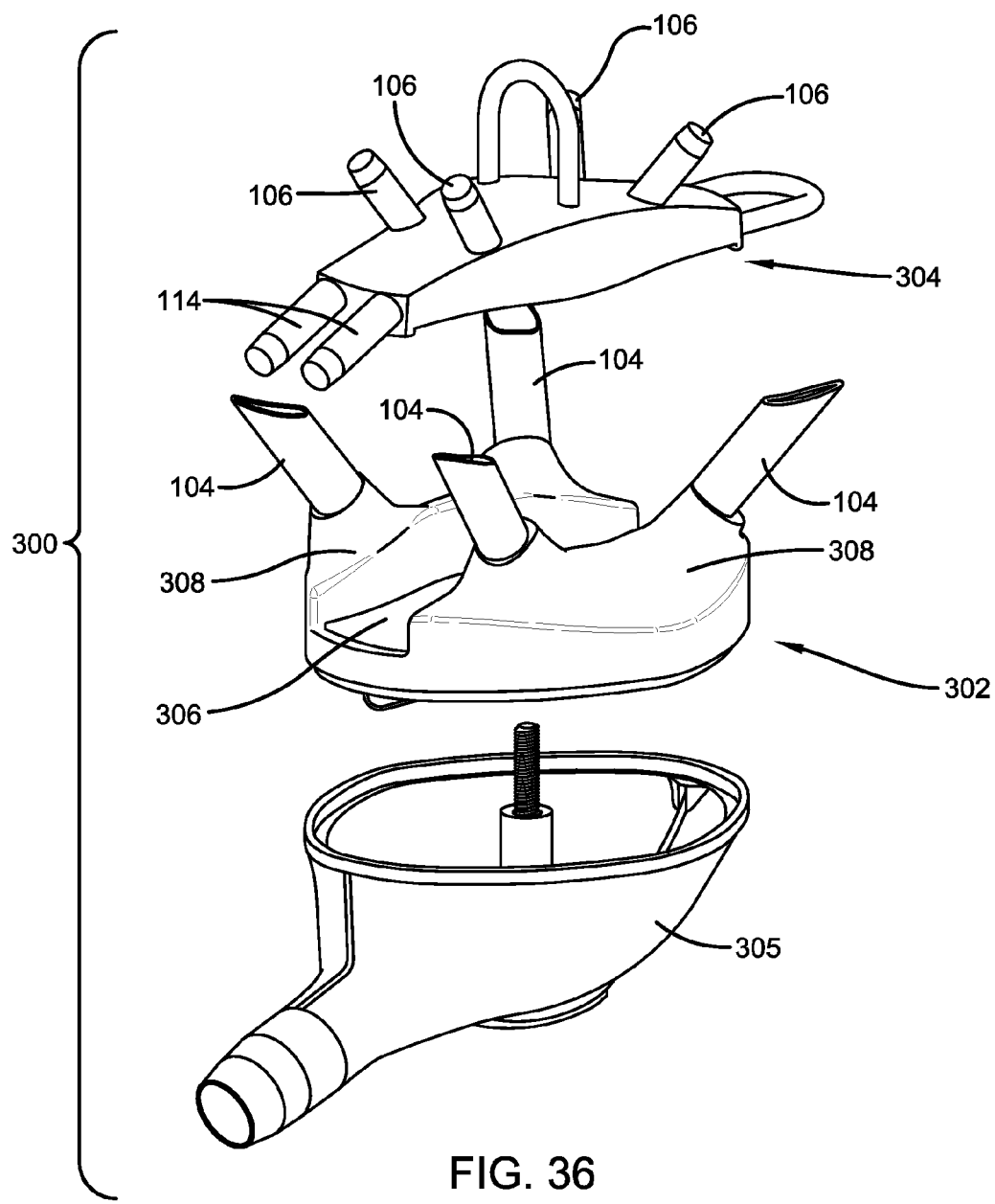
FIG. 36 is an exploded view of a claw top configuration with a removable air fork.
Figure 38:
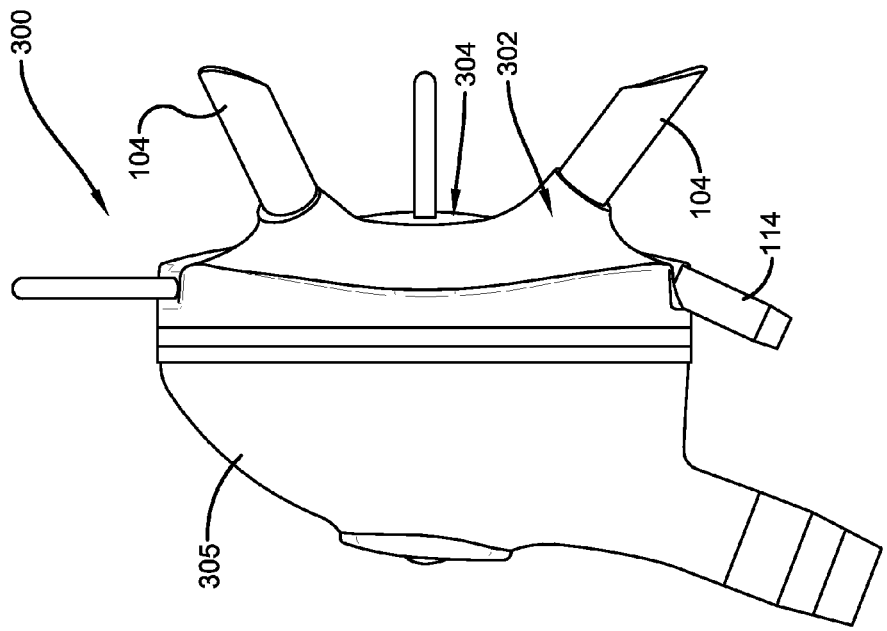
FIG. 38 is a side view of FIG. 36.
Figure 37:
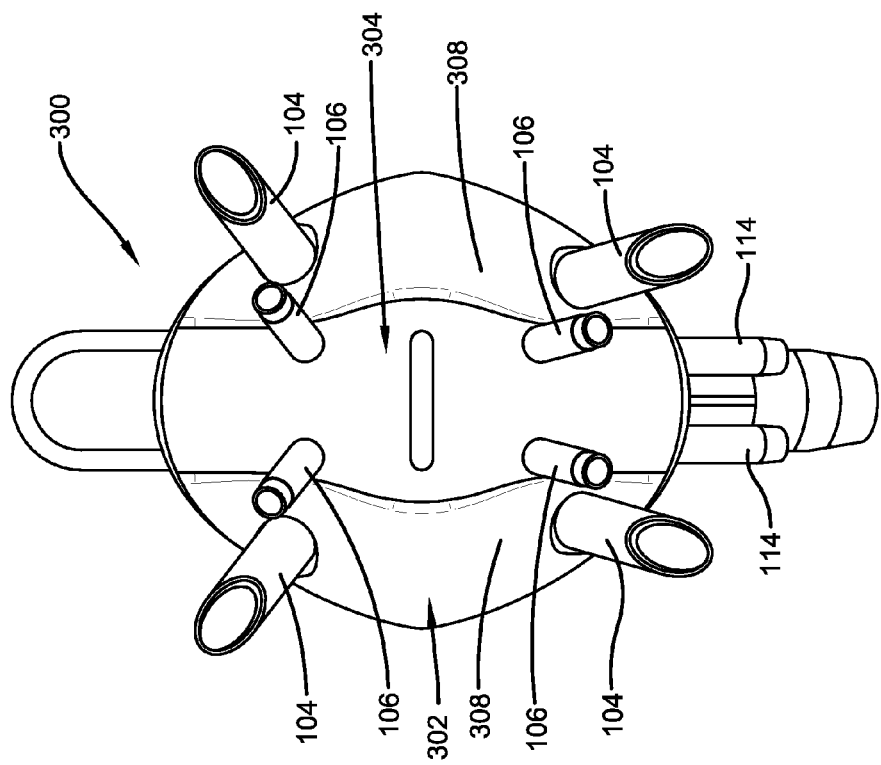
FIG. 37 is a top plan view of FIG. 36.

Another feature that helps the alignment of liner 202 with shell 206 is the use of a plurality of axial ribs 240 and axial slots 242. In the configuration depicted in FIGS. 33-35, axial ribs 240 extend inwardly from the inner surface of mouthpiece flange 234 and axial slots 242 are defined by the outer surface of the top of shell 206. In other configurations, axial slots 242 are defined by liner 202 and axial ribs 240 extend outwardly from shell 206. To limit the connection between liner 202 and shell 206, ribs 240 and slots 242 are unevenly disposed. For example, in the exemplary configuration there are four slot and rib combinations on one side and only three slot and rib combinations on the other side. As also shown in the drawings, the slot 242 aligned with notch 232 is longer than the other slots 242.

In many liner and shell assemblies, it is possible in normal use for the liner to be rotated relative to the shell. This may introduce twist to the liner barrel and can reduce milking performance. In the exemplary configurations, ribs 240 are disposed radially around the inside of the outer liner mouthpiece flange 234. The plurality of matching female axial slots 242 are disposed radially around the outside top of the shell. The engagement of these features during assembly of liner to shell helps to eliminate liner/shell rotation in normal use. In one embodiment the ribs and slots are asymmetrically arranged around the mouthpiece 234 so that the liner 202 can only be properly installed into the shell 206 in one rotational position. This invention properly orients the mouthpiece in relation to the shell 206 and locks it in rotational position for optimum milking performance. This spline geometry located on the outside of the upper shell allows for a face seal at the underside of the mouthpiece. This seal makes use of the liner barrel tension to generate high contact pressure in a stable protected location.

These liner configurations provide a method of delivering pulsation air to a shell without the step of separately connecting the upper end of the short air tube to a nipple on the shell. The connection of the liner with the shell automatically forms the fluid communication between the short air tube and the shell pulsation chamber. The additional step of connecting a separate short air tube to an air tube nipple disposed on the outside of shell 206 is not required. The elimination of this step increases the efficiency of assembling the teat cup assemblies.

An exemplary configuration of a claw 300 having a claw top 302 with a removable air fork 304 is shown in FIGS. 36-42. Claw 30 is comprised of three primary components; claw top 302, air fork 304, and a bowl 305. Sealing gaskets are used at all part interfaces and a single bolt thru the center secures the three components together. The shape and arrangement of the components accomplishes pulsation air distribution. This arrangement provides a simple assembly process while allowing common manufacturing processes for each subcomponent due to their simple shape. Air fork 304 may be fabricated from a variety of materials such as metals and plastics. Air fork 304 is configured to removably nest within the recess 306 defined through the center of the top wall 308 of claw top 302.

Air fork 304 includes pulsation nipples 106. Air fork 304 includes a pulsation nipple 106 for each liner nipple 104 of claw top 302. The exemplary configuration has two pulsation nipples projecting forwardly and two pulsation nipples projecting rearwardly at locations and at angles so they are substantially parallel to liner nipples 104 on claw top 302. When air fork 304 is nested within claw top 302, each pulsation nipple 106 is disposed next to a liner nipple 104 to define nipple pairs. Each liner nipple 104 is configured to be connected with the lower end (or outlet) of a short milk tube and each pulsation nipple 106 is configured to be connected with the lower end (or inlet) of a short air tube. Each nipple 106 extends away from the body of air fork 304 at an extension direction. When air fork 304 is positioned on claw top 302, the extension direction of each nipple in a nipple pair is substantially the same. In this context, both nipples 104 and 106 extend at similar (within 10 degrees of each other as measured to each standard XYZ axis) angles and they may be parallel in one particular configuration. The extension direction may be defined by the direction of the imaginary centerline 110 of each nipple or may be defined by the overall direction of the outer sidewall of the nipple (as described above). The outer wall of each nipple may be smooth or ribbed to add gripping surfaces to the nipples. Arranging nipple 104 and 106 in the same extension direction minimizes bowing between the short air tube and the short milk tube when claw 300 is used with separate short milk and air tubes.

In the exemplary configuration, nipples 104 and 106 are spaced apart so that the sidewalls of the tubes may be received between the nipples. In another configuration, nipples 104 and 106 touch each other for use with different tubes.

Air fork 304 also includes a pair of main pulsation delivery nipples 114 that receive the pulsation tube 22 that delivers the alternating vacuum. Air fork 152 defines passages 116 that provide fluid communication between nipples 106 and 114.

Claw 300 can be configured during manufacturing for parallel or herringbone barn milking. These nipples and supports on the ends of the claw top can be arranged during manufacturing to accommodate either parallel or herringbone configurations by changing their attachment locations. The resulting assembled product will therefore be configured for either parallel or herringbone barn milking, while using common sub-components for cost reduction.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A milking liner comprising:
   a barrel adapted to receive a teat of an animal to be milked;
   a short milk tube connected to the barrel;
   a short air tube directly connected to the short milk tube; the short air tube having a lower end that is offset from a lower end of the short milk tube, and wherein the short milk tube defines a sealing bead that is offset from a sealing bead defined by the short air tube.

2. The milking liner of claim 1, wherein the short air tube extends beyond the short milk tube.

3. The milking liner of claim 2, wherein the entire length of the short milk tube is connected to the short air tube.

4. The milking liner of claim 1, further comprising a mouthpiece connected to the barrel; the mouthpiece having a mouthpiece flange; the mouthpiece flange having one of a location tab and a location notch.

5. The milking liner of claim 4, further comprising a plurality of axial ribs extending from an inner surface of the mouthpiece flange.

6. The milking liner of claim 5, wherein the axial ribs are disposed asymmetrically about the mouthpiece flange.

7. The assembly of claim 1, wherein the milking liner includes a transition bead; the transition bead defining a seat adapted to engage a shell; the seat having a non-circular cross sectional shape.

8. The assembly of claim 7, wherein the seat that receives shell is tear-drop-shaped or egg-shaped.

9. A milking liner comprising:
   a barrel adapted to receive the teat of the animal to be milked;
   a short milk tube connected to the barrel;
   a short air tube connected to the short milk tube; the short air tube having a lower end that is offset from a lower end of the short milk tube;
   the short milk tube defining a sealing bead that is offset from a sealing bead defined by the short air tube;
   the short air tube extending beyond the short milk tube; and
   the entire length of the short milk tube being connected to the short air tube.

10. The milking liner of claim 9, further comprising a mouthpiece connected to the barrel; the mouthpiece having a mouthpiece flange; the mouthpiece flange having one of a location tab and a location notch.

11. The milking liner of claim 10, further comprising a plurality of axial ribs extending from an inner surface of the mouthpiece flange.

12. The milking liner of claim 11, wherein the axial ribs are disposed asymmetrically about the mouthpiece flange.

13. The assembly of claim 9, wherein the milking liner includes a transition bead; the transition bead defining a seat adapted to engage a shell; the seat having a non-circular cross sectional shape.

14. The assembly of claim 13, wherein the seat that receives shell is tear-drop-shaped or egg-shaped.

* * * * *